United States Patent [19]

Yagoto et al.

[11] Patent Number: 5,019,701
[45] Date of Patent: May 28, 1991

[54] AUTOMATIC FOCUSING APPARATUS WITH MOIRE FRINGES

[75] Inventors: Mitsutoshi Yagoto; Masayuki Mino, both of Osaka, Japan

[73] Assignee: Minolta Camera Kabushiki Kaisha, Osaka, Japan

[21] Appl. No.: 581,416

[22] Filed: Sep. 10, 1990

Related U.S. Application Data

[63] Continuation of Ser. No. 332,363, Mar. 31, 1989, abandoned, which is a continuation of Ser. No. 169,420, Mar. 17, 1988, abandoned.

[30] Foreign Application Priority Data

Mar. 17, 1987 [JP] Japan .................................. 62-60007

[51] Int. Cl.$^5$ ................................................. G01J 1/20
[52] U.S. Cl. ............................... 250/201.5; 369/44.24
[58] Field of Search ............... 250/201, 237 G, 201.4, 250/201.5; 354/402, 403, 404, 406; 356/374; 369/44–46, 109, 44.23, 44.24

[56] References Cited

U.S. PATENT DOCUMENTS

| 3,245,307 | 4/1966 | De Lang | 356/374 |
| 3,962,720 | 6/1976 | Braat | 369/46 |
| 4,475,182 | 10/1984 | Hosaka | 250/201 DF |
| 4,503,324 | 3/1985 | Yokota | 250/201 DF |
| 4,651,314 | 3/1987 | Yoshikawa et al. | 369/45 |

FOREIGN PATENT DOCUMENTS 3531579 3/1989 Fed. Rep. of Germany .
53-39123 10/1978 Japan .
57-21263 1/1982 Japan .
61-11773 9/1986 Japan .

OTHER PUBLICATIONS

Focusing Errors in a Collimating Lens or Mirror: Use of a Morie Technique, Fouere et al., Applied Optics, vol. 13, No. 6, 1974.
Japan. J. Appl. Phys. 9 (1970) 1011–1012: "Theoretical Interpretation of Moire Pattern Two Grids of Parallel Lines".

Primary Examiner—David C. Nelms
Attorney, Agent, or Firm—Price, Gess & Ubell

[57] ABSTRACT

An automatic focusing apparatus having an objective lens for forming a beam from a semiconductor laser as a spot image on an image subjecting face, a driving unit for driving the objective lens in a direction parallel to an optical axis thereof, a beam splitter disposed between the semiconductor laser and the objective lens, a pair of grids for generating a moiré image displaced in a travelling path of a beam returning from the image subjecting face and reflected by an inclined prism face of the beam splitter, a photo detector for detecting the moiré image generated by the grids and an control unit for evaluating a focusing error based on a variation in the moiré image pattern and for controlling the driving unit so as to correct the focusing error. The first grid and the second grid are interspaced in parallel to each other along a beam axis and angularly displaced from each other about the beam axis.

9 Claims, 5 Drawing Sheets

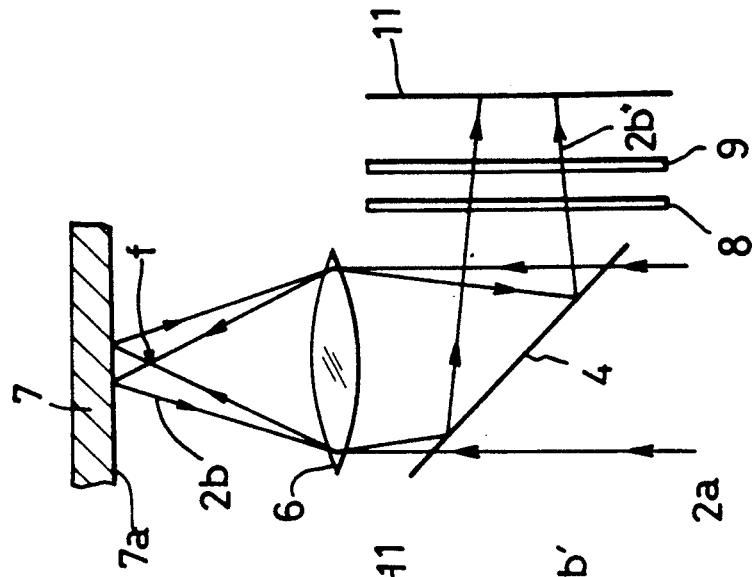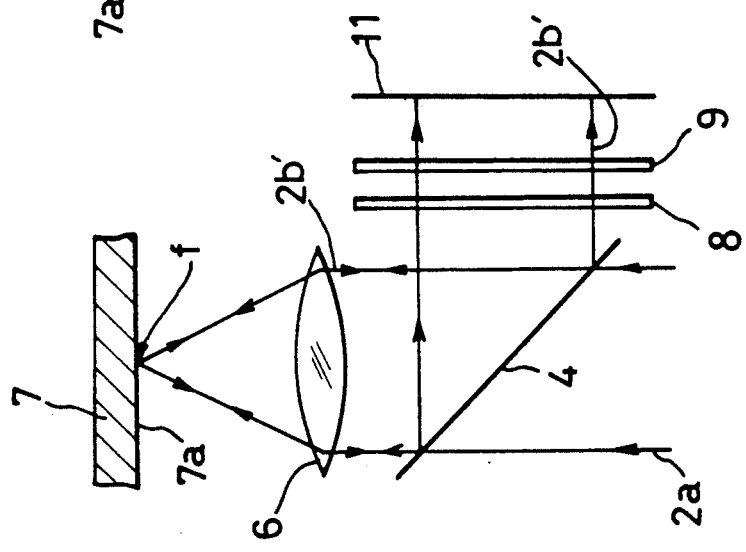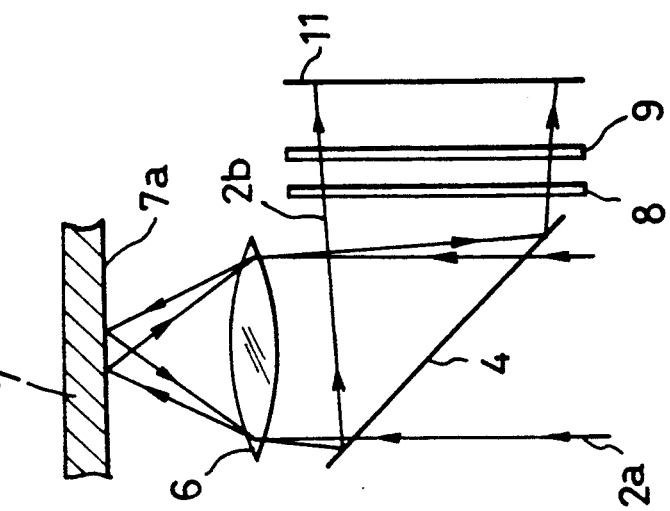

AUTOMATIC FOCUSING APPARATUS WITH MOIRE FRINGES

This is a continuation of application Ser. No. 332,363, filed on Mar. 31, 1989, for an AUTOMATIC FOCUSING APPARATUS, now abandoned, which is a file wrapper continuation application of U.S. Ser. No. 169,420, filed on Mar. 17, 1988, now abandoned.

BACKGROUND OF THE INVENTION (1) Field of the Invention

The present invention relates to an automatic focusing apparatus. More specifically, the present invention relates to an automatic focusing apparatus in devices such as a pick-up device employed for recording and reproducing information into and from an optical disk.

(2) Description of the Prior Art

The conventional automatic focusing apparatus in a pick-up device or the like used in an optical disk device, employs the astigmatism method or the light-blocking method. In the former method, astigmatism is caused to occur by the use of a cylindrical lens or the like and a focusing error signal is obtained by the use of a four-element photo detector. On the other hand, in the latter method, a portion of reflected light is blocked by means of a knife edge or the like and an image of a plane including this knife edge is formed via a converging lens on a four-element detector thereby obtaining a focusing error signal.

In these methods, since the cylindrical lens, the knife edge or the like is employed in the focusing detecting optical system as noted above, if it is attempted to increase sensitivity of the automatic focusing apparatus, the cylindrical lens needs to have a longer focal length and to be placed an adequately long distance from the photocell. As the result, the whole apparatus tends to be large and heavy.

SUMMARY OF THE INVENTION

In view of the above-noted state of the art, it is the primary object of the present invention to provide an automatic focusing apparatus capable of overcoming the above-described problem of the prior art, the focusing apparatus carrying out a focusing operation by utilizing a moiré image formed by a beam returning from a beam subjecting face such as the surface of an object.

In order to accomplish the above object, an automatic focusing apparatus related to the present invention comprises an objective lens for forming a beam from a semiconductor laser as a spot on an object or a beam subjecting face, driving means for driving the objective lens in a direction parallel to the optical axis thereof, a beam splitter disposed between the semiconductor laser and the objective lens, optical means for generating a moiré image disposed in a travelling path of a beam returning from the object or beam subjecting face and reflected by an inclined prism face of the beam splitter, a photo detector for detecting the moiré image generated by the moiré image generating means, evaluating means for evaluating a moiré image pattern based on a signal from the photo detector thereby determining a focusing error and control means for controlling the driving means so as to correct the focusing error.

With the above-described construction, the coherent laser beam is converged through the objective lens into a spot on the object or beam subjecting face, and the diverging beam reflected therefrom is converged again through the objective lens. The converged returning beam may take the form of a spread beam, a parallel beam or a converged beam depending on a positional relationship between the focal point of the beam and the beam subjecting face. Accordingly, the moiré image, i.e. the moiré fringes formed by this returning beam varies with the characteristics, e.g. the spread condition or the converged condition of the returning beam. Consequently, the objective lens is driven for focusing based on the above variations in the moiré image.

Preferably, the moiré image generating optical means may include a first grid and a second grid spaced in parallel to each other along a beam axis and angularly displaced from each other about the beam axis.

As a result of this arrangement of the grids, a moiré image pattern will be generated and that moiré image pattern will rotate if subject to either convergent or divergent light relative to a moiré image pattern produced by coherent light. By evaluating any relative rotation of the moiré image pattern compared to a non-rotated moiré image pattern produced by coherent light, it is possible to determine if focusing error exists.

With this arrangement, it becomes possible to form the whole automatic focusing apparatus light-weight and also the apparatus will obtain further advantages of being suited for mass production and of reduced manufacturing cost. Further, if one grid is affixed to the beam splitter, the automatic focusing apparatus may be formed more compact.

Other features and advantages of the invention will be apparent from the following description taken in connection with the accompanying drawings.

BRIEF DESCRIPTION OF THE DRAWINGS

FIGS. 3A, 3B and 3C are views of an optical path for illustrating relationships between a position of an optical disk and a beam.

DESCRIPTION OF THE PREFERRED EMBODIMENT

A preferred embodiment of the present invention will be particularly described next with reference to the accompanying drawings.

Figure 1:
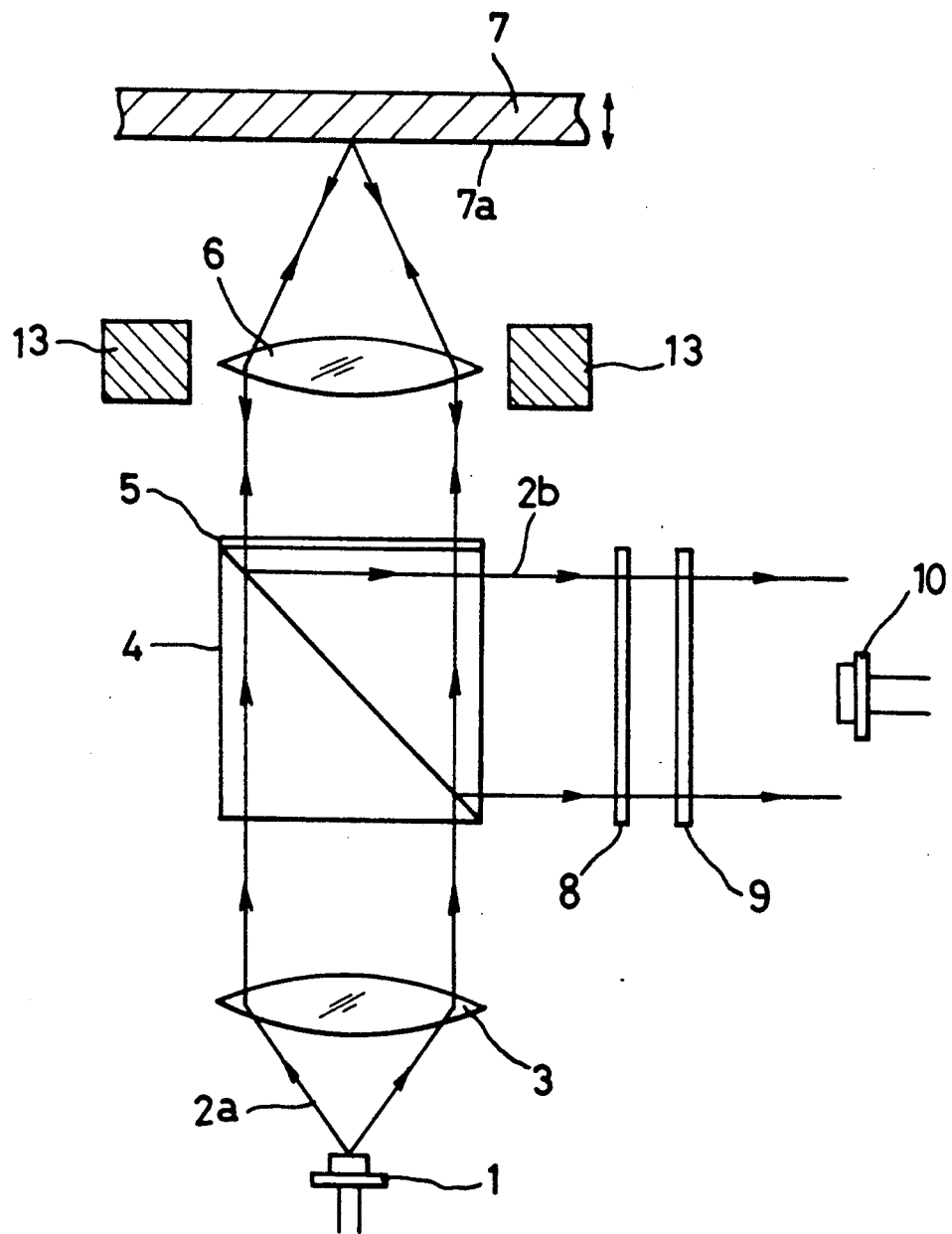
FIG. 1 is a view showing a construction of an automatic focusing apparatus according to an embodiment of the present invention.
Figure 2:
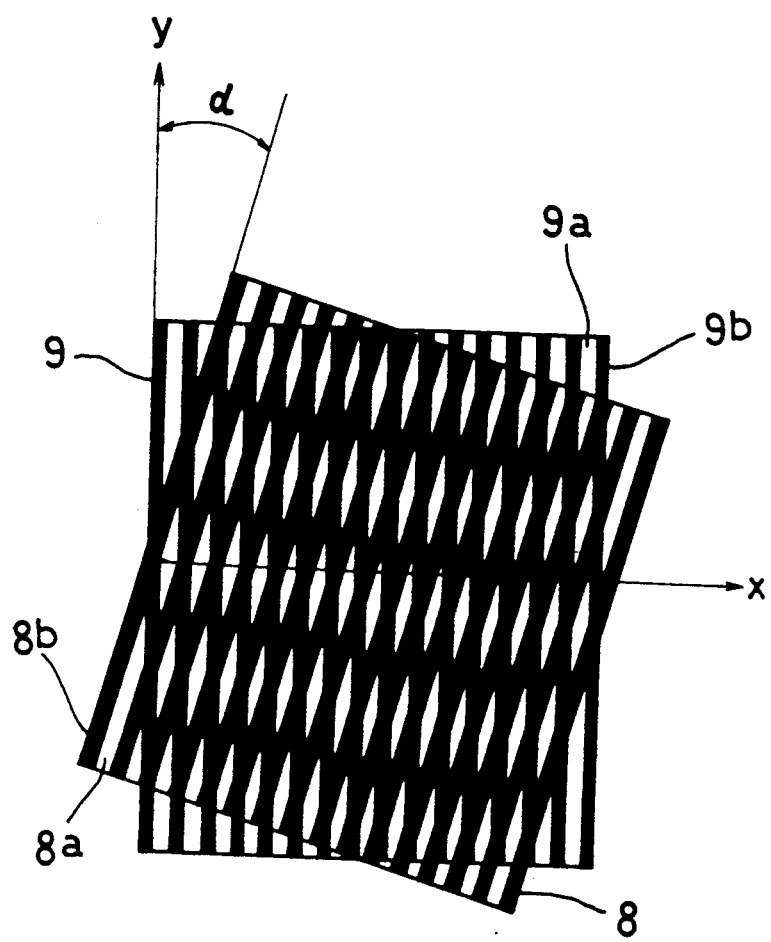
FIG. 2 is a front view of grids for illustrating a relationship between the two grids.

FIG. 1 shows a construction of an automatic focusing apparatus for focusing an optical disk 7. That is, a beam 2 from a semiconductor laser 1 is converted through a collimator lens 3 to be a parallel beam 2a. This parallel beam 2a passes a beam splitter 4 including a prism face having a 45 degree slope with respect to a beam axis and a quarter wave plate 5 and then is converged through an objective lens 6 to irradiate in the form of a spot an image face 7a of the optical disk 7. A beam 2b reflected and diverged by this image face 7a travels reversely in the optical path to be converged through the objective lens 6 and passes the quarter wave plate 5 and is reflected at the right angle by the prism face of the beam splitter 4. Thereafter, the beam passes two grids 8 and 9 and is detected by a four-element photo detector 10. The two grids 8 and 9 generate moiré fringes for obtaining focusing signals. As shown in FIG. 2, these grids 8 and 9 are respectively provided with at a constant pitch beam passing portions 8a and 9a and opaque portions 8b and 9b in alternate parallel relations. The grids 8 and 9 are disposed with a mutual displacement through an angle of α about an beam axis and with a space therebetween along the optical path.

Next, referring to FIGS. 3A, 3B and 3C, it will be described how the grids 8 and 9 function in response to vertical movements of the image face 7a of the optical disk 7. FIG. 3A shows a condition where the image face 7a of the optical disk 7 is displaced from a focal point f of the objective lens toward the objective lens. FIG. 3B shows a condition where the image forming face 7a of the optical disk 7 is right at the focal point f of the objective lens 6. And, FIG. 3C shows a condition where the image face 7a of the optical disk 7 is displaced from the focal point f of the objective lens 6 in a direction apart from the objective lens.

In the above condition shown in FIG. 3A, the parallel beam 2a emerging from the collimator lens 3 travels via the objective lens 6 to the image face 7a of the optical disk 7 and the reflected beam from this image face 7a again passes the objective lens 6 to become a spread beam 2b and is then reflected by the beam splitter 4 to reach the grids 8 and 9. In the condition shown in FIG. 3B, the reflected beam from the image face 7a passes through the objective lens 6 to become a parallel beam 2b'. In FIG. 3C, the reflected beam from the image face 7a passes the objective lens 6 to become a converged beam 2b". The respective beams 2b' and 2b" reach the grids 8 and 9. Therefore, in the case of the spread beam shown in FIG. 3A, the image of the grid 8 is enlargedly projected on the grid 9. That is to say, on the grid 9 there is provided the same condition as provided when the image of the grid 8, but is is superposed with a wider pitch. For this reason, if a screen 11 is placed instead of the photo detector 10, the image is projected on the screen 11 in the enlarged form. In the case of the parallel beam shown in FIG. 3B, since the grid pitch is invariable, there is provided the same condition as when grids of the same pitch are superposed on each other. Further, in the case of the converged beam 2b" shown in FIG. 3C, since a reduced image of the grid 8 is projected onto the grid 9, there is provided the same condition on the grid 9 as provided when the image of the grid 8, but the condition is superposed with a narrower pitch, in the opposite manner to that shown in FIG. 3A.

As described above, by disposing the two grids 8 and 9 with a certain interdistance, there occurs a pitch difference between the superposed images of the two grids.

Next, with reference to FIG. 2, it will be described how such pitch difference affects a generated moiré fringes.

If an x-y rectangular coordinate system with the direction of a disposing array of the grid 9 being the x axis is used and assuming that the pitches of the grids 8 and 9 are a and b, respectively, and that the grid 8 is superposed on the grid 9 with a displacement angle of α, then, referring to Japanese Journal of Applied Physics 9 (1970) pp 1011-1012, grid fringes F1 and F2 of the grids 8 and 9 are respectively represented by:

$$F1 = \frac{1}{2}\left(1 + \cos\frac{2\pi}{a/\cos\alpha}(x - y\tan\alpha)\right) \quad (1)$$

$$F2 = \frac{1}{2}\left(1 + \cos\frac{2\pi}{b}x\right) \quad (2)$$

Since the superposition of the grid fringes may be represented by a product of F1 and F2, we obtain $$4F1 \cdot F2 = 1 + \cos\left\{\frac{2\pi\cos\alpha}{a} \cdot (x - y\tan\alpha)\right\} + \cos\frac{2\pi}{b}x + \cos\left\{\frac{2\pi\cos\alpha}{a}x - y\tan\alpha\right\} \cdot \cos\frac{2\pi}{b}x = 1 + \cos\left\{\frac{2\pi\cos\alpha}{a} \cdot (x - y\tan\alpha)\right\} + \cos\frac{2\pi}{b}x + \frac{1}{2}\cos 2\pi \cdot \left(\frac{\cos\alpha}{a}x - \frac{\sin\alpha}{a}y + \frac{x}{b}\right) + \frac{1}{2}\cos 2\pi \cdot \left(\frac{\cos\alpha}{a}x - \frac{\sin\alpha}{a}y - \frac{x}{b}\right) \quad (3)$$

Since what is visible as the moiré fringes comprises the fringes of the lowest frequency where the value α is close to 0, the moiré fringes are given by the last term of the above equation (3); that is $$\frac{1}{2}\cos 2\pi\left(\frac{\cos\alpha}{a}x - \frac{\sin\alpha}{a}y - \frac{x}{b}\right) \quad (4)$$

Then the equation of the fringes is $$\frac{\cos\alpha}{a}x - \frac{\sin\alpha}{a}y - \frac{x}{b} = n \quad (5)$$

where n is an integer.

Then, the above equation (5) is now $$\sin\alpha \cdot y = \left(\cos\alpha - \frac{a}{b}\right)x - na$$

Therefore, the angle of the moiré fringes, relative to the x axis varies depending on the values a and b of the grid pitches.

First, consider the case shown in FIG. 3B when a=b, i.e. the reflected beam from the image forming face 7a reaches the grids 8 and 9 as the parallel beam 2b'. In this situation we obtain $$y = \frac{\cos\alpha - 1}{\sin\alpha} x - \frac{na}{\sin\alpha}$$

$$= -\tan\frac{\alpha}{2} \cdot x - \frac{na}{\sin\alpha}$$

That is, there is generated a linear moiré fringe pattern having an inclination angle:

$$-\tan\frac{\alpha}{2}$$

and a y-direction pitch:

$$\frac{a}{\sin\alpha}.$$

In this case, the moiré fringes approach the x axis and the pitch increases as $\alpha$ approximates the value 0.

Next, consider the cases shown in FIGS. 3A and 3C when a≠b, i.e. the reflected beams from the image forming face 7a respectively comprise the converged beam and the spread beam. The moiré fringes are represented by the equation $$y = \frac{\cos\alpha - \frac{a}{b}}{\sin\alpha} x - \frac{na}{\sin\alpha}$$

Therefore, there is generated a linear moiré pattern having an inclination angle:

$$\frac{\cos\alpha - \frac{a}{b}}{\sin\alpha}$$

and a y-direction pitch:

$$\frac{a}{\sin\alpha}.$$

In this case, as $\alpha$ approximates the value 0, there is generated a pattern normal to the x axis with ab/(b−a) being the x direction pitch.

For example, assume that $\alpha = 15$ degrees and a/b varies to be 0.9, 1, and 1.1, we obtain the following table;

|  | a/b | tan θ | θ (deg.) |
|---|---|---|---|
| converged beam | 0.9 | 0.25 | 14.29 |
| parallel beam | 1.0 | −0.13 | −7.50 |
| spread beam | 1.1 | −0.52 | −27.39 |

In the table, $\theta$ is the inclination angle of the moiré pattern.

Figure 4A:
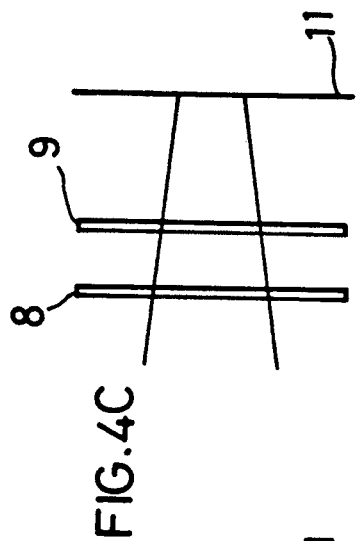
FIGS. 4A, 4B and 4C are charts showing variations in the reflected beam and variations in the moiré fringes.
Figure 4B:
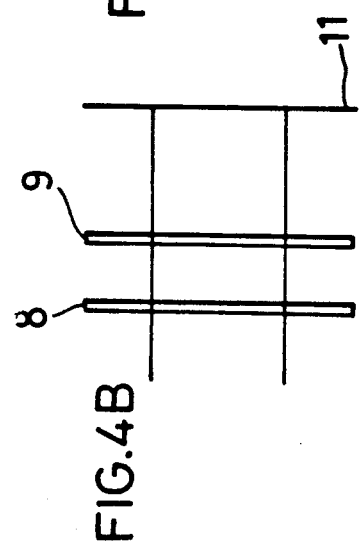
Figure 4C:
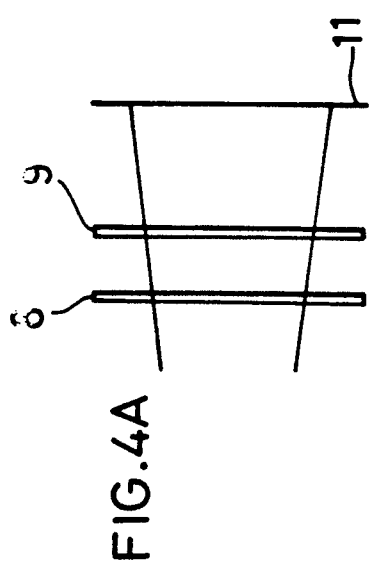
Figure 5A:
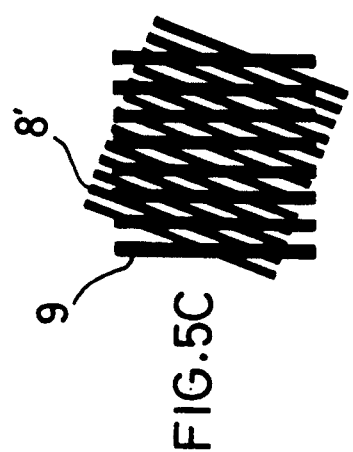
FIGS. 5A, 5B and 5C are views showing conditions in which an image of a first grid is projected on a second grid.
Figure 5B:
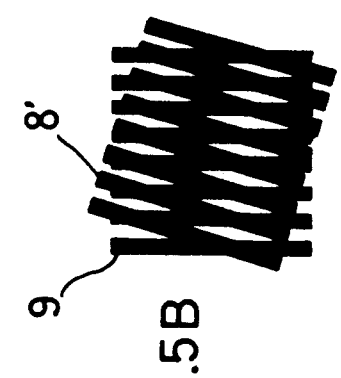
Figure 5C:
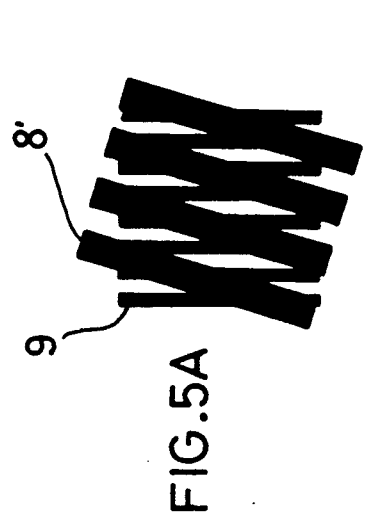
Figure 6A:
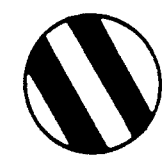
FIGS. 6A, 6B and 6C are views schematically showing moiré fringes formed on a screen.
Figure 6B:
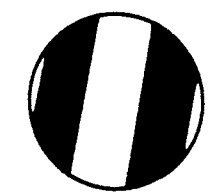
Figure 6C:
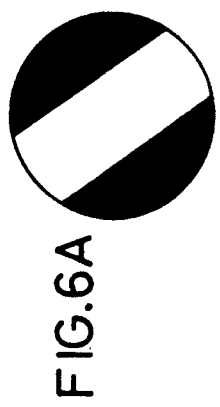

The inclination of the moiré fringe pattern varies depending on the position of the image face 7a of the optical disk 7. Corresponding to FIGS. 4A, 4B and 4C respectively, these conditions where the image 8' of the grid 8 is projected on the grid 9 are shown in FIGS. 5A, 5B and 5C, respectively. And, the moiré patterns generated in the respective conditions are schematically shown in FIGS. 6A, 6B and 6C. That is, as the grid pitch varies, so does the inclination of the moiré pattern. And, if this variation is carried out steplessly, the moiré pattern has its inclination gradually varied simulating a rotational movement and at the same time the image on the screen is zoomed to change in its dimensions.

The present invention carries out the focusing operation by utilizing the above-described phenomenon. This focusing operation will be more particularly described hereinafter with reference to FIG. 7 showing relationships between the moiré pattern and the output of the four-element photo detector 10.

Figure 7A:
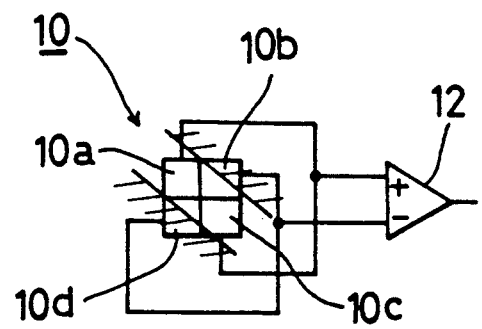
FIGS. 7A, 7B and 7C are diagrams showing relationships between outputs of a four-element photo detector and the moiré fringes.
Figure 7B:
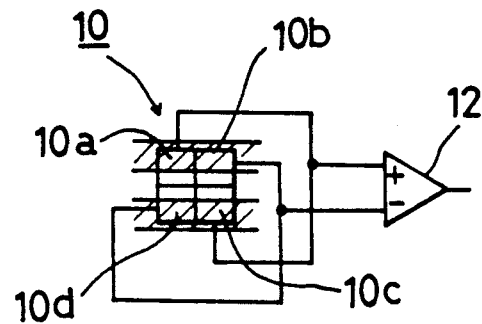
Figure 7C:
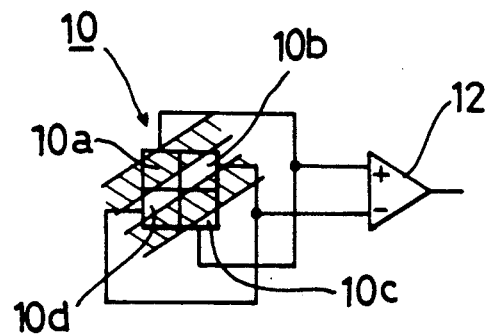
Figure 8:
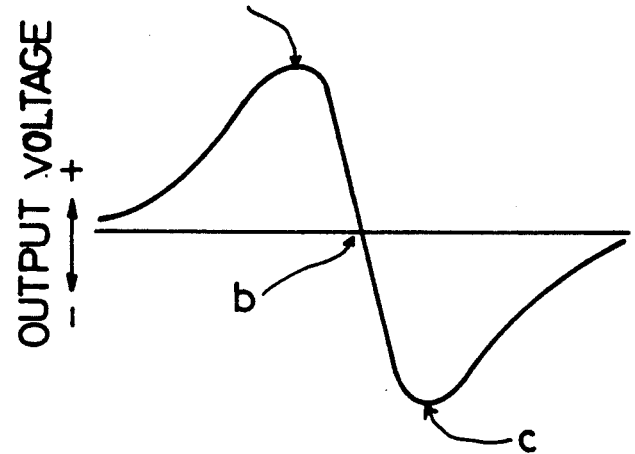
FIG. 8 is a graph showing outputs from the photo detector.

The moiré fringes projected on the four-element photo detector 10 are shown in FIGS. 7A, 7B and 7C, with FIG. 7A showing the case of FIG. 3A where the reflected beam from the image face 7a of the optical disk 7 comprises the spread beam, with FIG. 7B showing the case of the FIG. 3B where the reflected beam comprises the parallel beam and with FIG. 7C showing the case of FIG. 3C where the reflected beam comprises the converged beam, respectively. Elements 10a and 10c aligned on the diagonal line of the four-element photo detector 10 are connected to a positive input terminal of a comparator circuit 12 whereas the other elements 10b and 10d of the same are connected to a negative input terminal of the comparator circuit 12. The voltages applied to these terminals are compared. The comparator circuit 12 has an output curve similar to a sine wave as shown in FIG. 8, with the comparator 12 generating a positive peak output: a in the condition shown in FIG. 7A; an output b in the condition shown in FIG. 7B; and a negative peak output c in the condition shown in FIG. 7C. That is to say, when the image face 7a of the optical disk 7 is brought close to the objective lens 6, there is generated the output a. When the image face 7a is just positioned at the focal point of the objective lens 6, there is generated the output b. And, when the image face 7a is distant from the objective lens 6, there is generated the output c. By feeding back these outputs to a voice coil 13 for moving the objective lens 6 along its optical axis, the objective lens 6 may be driven for focusing.

In this invention, if the grids are placed in the optical path thereby causing diffraction to occur and interference fringes are consequently produced in the optical path, the effect described in the above embodiment may not be achieved. Therefore, it is essential that the grids have a large pitch or a narrow distance therebetween in order to prevent the occurrence of the interference fringes.

In the above-described embodiment, the automatic focusing apparatus is of the type used in a pick-up device for an optical disk. However, it is needless to say that the present invention will find its applications also in an automatic focusing apparatus for a microscope or the like.

"As is apparent, many modifications and adaptations of the preferred embodiment can be made without departing from the scope and spirit of the invention. Therefore, it is to be understood that, within the scope of the appended claims, the invention may be practiced other than as specifically described herein."

What is claimed is:

1. An automatic focusing apparatus comprising:
   an objective lens for forming a beam from a semiconductor laser as a spot image on an object;
   driving means for driving said objective lens in a direction parallel to an optical axis thereof;
   a beam splitter disposed between said semiconductor laser and said objective lens;
   optical means for generating a moiré image disposed in a travelling path of a beam returning from the object and reflected by an inclined prism face of said beam splitter, including a first grid and a second grid spaced in parallel to each other along a beam axis and angularly displaced from each other about the beam axis, the grids having either a sufficiently large pitch for lines forming the grids or a sufficiently narrow distance from each other along a beam axis to prevent interference fringes when the beam of the laser passes through the grids, wherein said moiré image when produced by either convergent or divergent light will be rotated in orientation relative to a moiré image pattern produced by coherent light;

a photodetector means for detecting the moiré image generated by said optical means;

evaluation means for evaluating a moiré image pattern to determine the existence or nonexistence of relative rotation of said moiré image pattern thereby determining a focusing error, and control means for controlling said driving means so as to correct the focusing error.

2. An automatic focusing apparatus as defined in claim 1, wherein said first grid is affixed to said beam splitter.

3. An automatic focusing apparatus as defined in claim 1, wherein said photo detector means includes a photo detector face divided into four elements for generating four kinds of signals.

4. An automatic focusing apparatus as defined in claim 3, wherein said evaluating means evaluates the rotation of the moiré pattern and determines the focusing error by a calculation incorporating the four signals from the photo detector means.

5. An automatic focusing apparatus as defined in claim 3, wherein said evaluating means evaluates a rotation of the moiré image pattern and determines the focusing error by a calculation incorporating the four signals from the photo detector means.

6. An automatic focusing apparatus as defined in claim 3, wherein said evaluating means evaluates the extent of the moiré image pattern and determines the focusing error by a calculation incorporating the four signals from the photo detector means.

7. A method of automatic focusing on an object comprising the steps of:

providing an objective lens for forming a beam from a semiconductor laser that is a spot image on the object;

driving said objective lens in a direction parallel to an optical axis thereof;

providing a beam splitter positioned between said semiconductor laser and said objective lens;

generating a moiré image disposed in a travelling path of a beam returning from the object and reflected by an inclined prism face of said beam splitter so that the moiré image pattern will rotate if subject to either convergent or divergent light relative to a moiré image pattern produced by coherent light;

providing a photodetector means for determining the specific moiré image generated by said optical means;

evaluating the moiré image pattern to determine the existence of nonexistence of relative rotation of the moiré image compared to the moiré image pattern produced by coherent light, the evaluation being based on a signal from said photodetector, thereby determining any focusing error, and controlling said driving step so as to correct the focusing error.

8. An automatic focusing apparatus for focusing on an optical disk, comprising:

a light source;

a pair of diffraction grids;

an objective lens to focus the light from the light source on the optical disk;

photodetector means for sensing light patterns;

means for diverting the light reflected off the optical disk back through the objective lens to pass through the two diffraction grids, the two diffraction grids are displaced from one another and have an uneven diffraction alignment, said light beams creating a moiré image pattern, as a result of the relative uneven diffraction alignment of the diffraction grids, that will rotate the moiré image pattern when subject to convergent or divergent light relative to a moiré image pattern that occurs when subject to coherent light, the moiré image pattern being projected upon the photodetector means;

means for evaluating the moiré image pattern based upon corresponding signals from the photodetector means to determine the existence or non-existence of relative rotation of the moiré image compared to the moiré image pattern produced by coherent light, thereby determining a focusing error, and means for driving the objective lens so as to correct the focusing error.

9. The automatic focusing apparatus of claim 8 wherein the light source comprises a semiconductor laser.

* * * * *